Patented June 23, 1931

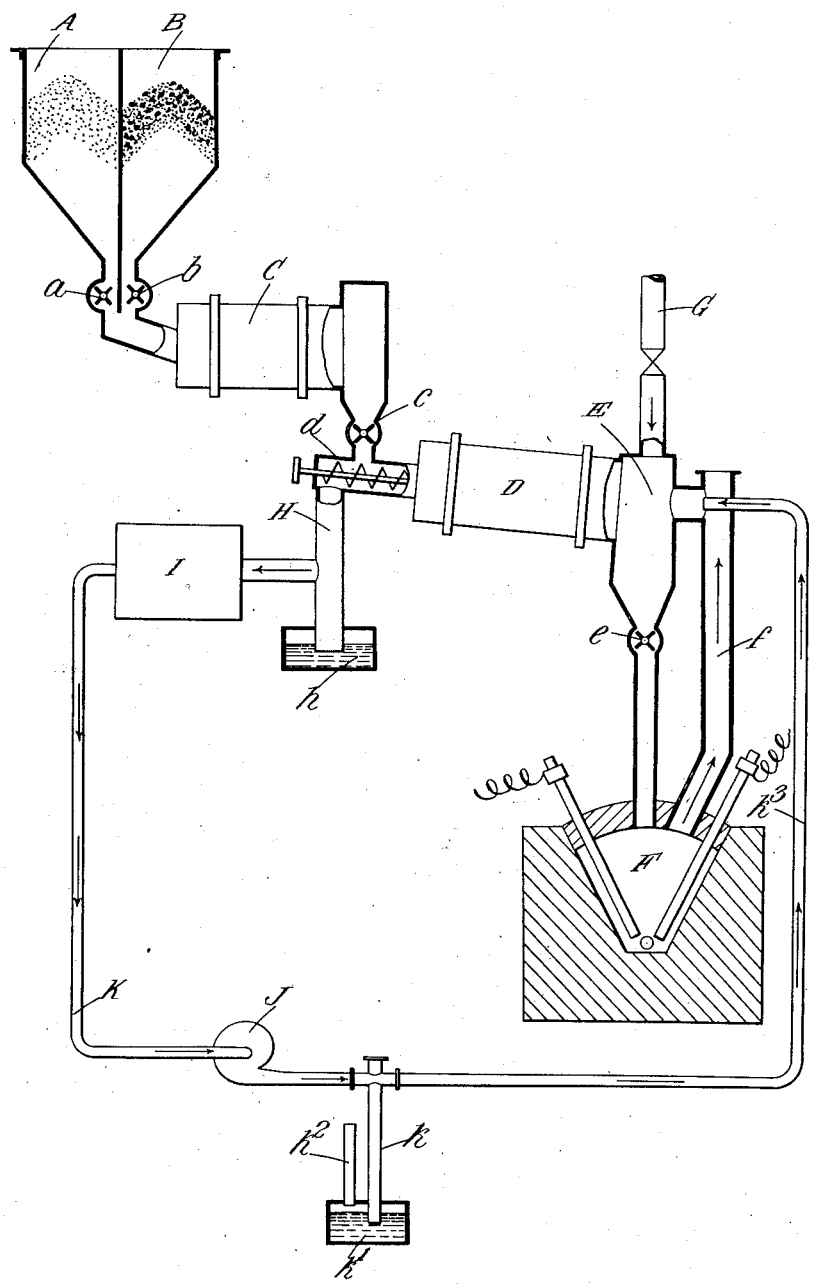

1,811,021

UNITED STATES PATENT OFFICE

GEORGES PATART, OF NEAR PARIS, FRANCE, AND HARALD NIELSEN, OF BROMLEY, ENGLAND

REDUCTION OF CALCIUM CARBONATE FOR THE MANUFACTURE OF CARBIDES

Application filed December 4, 1928, Serial No. 323,771, and in Great Britain December 30, 1927.

This invention relates to the decomposition of carbonates such as calcium carbonate and to the manufacture of carbides, such as calcium carbide, as also to the reduction of ores and the manufacture of metals and alloys.

We have observed that when any of the forms of calcium carbonate, such as chalk or limestone are being burnt by being directly mixed with coal, coke or other carbonaceous materials that the gases leaving the lime kilns consist principally of nitrogen and carbon oxides, the carbon dioxide representing from 20% to 30% and even more by volume of the resultant gases. Under such circumstances temperatures ranging from 700° C. to 1000° C. are required before the limestone is converted into calcium oxide or quicklime. A definite equilibrium has been found to exist between the temperature at which calcium carbonate is decomposed and the composition of the gases which are present during the decomposing operation. One feature of the present invention is based upon the discovery that this equilibrium can be varied or upset by varying the percentage of carbon dioxide present in the gases in contact with the limestone which is being decomposed, and, according to this feature of the present invention, the decomposition of calcium carbonate into calcium oxide is effected in the presence of a gas containing a controlled percentage of carbon dioxide whereby decomposition is effected at considerably lower temperatures than has previously been the case, i. e. in the neighbourhood of 700° C. The same advantage is also obtained if a controlled volume of carbon dioxide is used during the reduction of an oxide.

According to the present invention a carbonate is decomposed or an oxide is reduced by admixing the same with any suitable form of carbonaceous materials such as raw coal or semi-coke, and the necessary reaction temperature is provided by a hot current of gas containing a controlled percentage of carbon dioxide which is less than that normally present in combustion gases. In cases where raw coal is employed and admixed with the limestone the volatile constituents contained in the raw coal will also be distilled off and can either be removed from the gases in condensers or the like, or, by means of a cracking process, can be employed to enrich the residual gases yielded up during the decomposing or reducing process so as to render the same suitable for industrial purposes.

The carbonate or oxide which is to be decomposed or reduced is preferably mixed with a sufficient quantity of raw coal so that, after the distillation of the latter has been effected, sufficient residual carbon is left to effect a subsequent reaction or effect the completion of the reducing or decomposing action in an electric furnace, the vapours yielded up during the heat treatment of the raw coal being removed from the distillation chamber and the products of the chemical reaction, together with the balance of the coke resulting from the distillation process, being fed while still hot into the electric furnace. As the red hot material is fed directly from the distillation chamber into the electric furnace a great saving in electric current is effected, especially if hot gases from the electric furnace are passed directly from the electric furnace into the distillation and reducing or decomposing chamber and their sensible heat and reducing nature are also utilized therein. If necessary, the carbonate or oxide and the carbonaceous material can be raised in temperature to say 1000° C. to 1200° C. by the combustion of part of the combustible constitutents of the hot gases used for distillation purposes, so as to reduce the volatile content of the carbonaceous material to any desired extent.

The carbonaceous material employed may be constituted by the semi-coke produced by passing a gas, such as combustion gases which preferably contain a controlled percentage of carbon dioxide or water or producer gas, through an internally heated retort in such a manner that the sensible heat of the gas is employed to distill from the raw coal undergoing treatment the various volatile constituents, and also, if desired, to drive off a portion of the so-called permanent gases so as to reduce the volatile content of the coke to approximately 4 to 15%.

In order that the said invention may be clearly understood and readily carried into effect, the same will now be described more fully with reference to the accompanying drawing, which shows diagrammatically a layout of a plant, more particularly intended for the decomposition of calcium carbonate into calcium oxide simultaneously with the distillation of raw coal, and the conversion in an electric furnace of the calcium oxide and the residual carbon so produced into calcium carbide, but equally suitable, for example, for the reduction of ores.

A is a hopper containing an oxide or a carbonate with or without any other reagent, and B is a hopper containing raw carbonaceous material, such as bituminous coal, brown coal, or the like, the oxide or the carbonate and the coal being ground or crushed to any desired extent and the mixture being fed through rotary valves $b$ and $a$ to a rotary inclined mixing device C where the raw coal and the oxide or carbonate are intimately mixed together. The proportion of coal used is such that sufficient residual carbon is left after distillation and the completion or part completion of the decomposing or reducing action to effect any desired reaction in an electric furnace F into which the mixture is passed while still hot. From the mixer C the admixed coal and the oxide or carbonate pass through a rotary valve $c$ and are fed by a screw conveyor $d$ which is driven in any suitable manner into a rotary inclined retort or kiln D which constitutes the combined distillation and decomposing and reducing chamber. From the chamber D the distilled coal and the products of the reaction pass through a chamber E fitted with a rotary valve $e$ into an electric furnace F which may be of any suitable construction. $f$ is a pipe for conducting the gases rich in carbon monoxide evolved during the reaction in the electric furnace through the chamber E, which is adapted to serve as and when required as a combustion chamber, and G is a pipe for admitting a controlled volume of air to the combustion chamber E. During the heat treatment in the chamber D the gases evolved pass off through a conduit H fitted with an explosion seal $h$ to a condensing plant I, the stripped gases being drawn off by a fan J from the condensing plant through a pipe K which communicates through a branch pipe $k$ with a hydraulic seal $k^1$. The surplus gas escapes through a pipe $k^2$ and a controlled volume of the gas may be passed through a pipe $k^3$ to the combustion chamber E.

In operation, and in the manufacture, for example, of calcium carbide, the mixture of coal and calcium carbonate pass under control from the supply hoppers A, B to the mixer C, and a controlled volume of the admixed calcium carbonate and coal is fed by the screw conveyor $d$ into the chamber D. The hot gases passing through the chamber D move in countercurrent to the raw coal and calcium carbonate in the chamber D so that the hot gases drive off in vapour form from the raw coal the condensible oils and also, if desired, any desired proportion of the volatile content of the raw coal so as to reduce the volatile content of the resultant coke passing through the chamber D to any desired extent. During the heat treatment in the chamber D the calcium carbonate is also decomposed to calcium oxide, and owing to the fact that a sufficient excess of raw coal has been employed to effect not only the decomposition of the calcium carbonate to calcium oxide, but also to promote the subsequent calcium carbide reaction, the red hot coke which passes through the rotary valve $e$ into the carbide furnace F contains the requisite excess of carbon for carrying on the calcium carbide reaction. In the carbide furnace F the quicklime is reduced to calcium carbide, the extremely hot gas generated during the reaction (which in the case of the calcium carbide reaction consists principally of carbon monoxide) passing up the conduit $f$ through the combination chamber E where it may be mixed with return gas from the condensing plant I. In the distillation chamber D its sensible heat alone may be used for distillation purposes, the carbon monoxide also serving as a reducing agent. The carbon monoxide alone or the carbon monoxide and stripped gases, however, may be admixed with a controlled volume of air in the chamber E and part of the combustible constituents burnt so as to obtain any desired entrance temperature of the gases passing into the chamber D while still leaving a gas which is rich in carbon monoxide and deficient in carbon dioxide.

In the treatment of ores for the direct production of steel or a steel alloy the arrangement may be such that a preliminary reduction of the ores takes place in the distillation chamber D and their final conversion into steel or a steel alloy takes place in the electric furnace F.

The vapours set free during the heat treatment in the chamber D may be passed through dust cyclones, condensers, rotary oil or tar extractors, or the like for the recovery of oils and tars, and part of the residual gases containing the permanent gases evolved from the bituminous material, as also the oxides of carbon set free during the reducing or decomposing action, may be admixed and after, if desired, combustion of part of the combustible constituents thereof the mixture may be used as the distilling medium in the retort.

By the present invention the decomposition of a carbonate or the reduction of an oxide can be carried on at lower temperatures than heretofore owing to the fact that the reaction takes place in the presence of a hot gaseous medium containing a controlled percentage of carbon dioxide and which is usually also of a reducing character. Furthermore, by carrying on the process in the manner described a highly reactive coke, which is practically free from graphitic carbon, is produced simultaneously with the evolution and recovery of condensible volatile matter, and, if a sufficient additional quantity of carbonaceous material has been employed, the necessary carbon is left admixed with the oxide to carry on the reaction in the electric furnace. The latter can, as aforesaid, be fed directly and at high temperatures from the rotary retort to the electric furnace, thus resulting, not only in a saving in electric current, but also, in an acceleration in the process of manufacturing calcium carbide or reducing ores, owing to the high degree of reactivity of the semi-coke so produced.

It is to be understood that although the invention has been more particularly described in connection with the production of calcium carbide, the process may be employed for the reduction and smelting of metallic ores etc., and in such cases, the balance of the red hot coke, together with the reduced or partly reduced ore is fed from the chamber D into the electric furnace where the process of reduction is completed and where the metal is transformed into steel, or, by the addition of any suitable alloying element, into any desired steel alloy. In such cases the crushed metallic ore, which may be in the form of an oxide or a carbonate, etc. is substituted for calcium carbonate, the reducing operation and its conversion into metal or a metallic alloy taking place partly in the chamber D in contact with the carbonaceous material which is undergoing distillation and in the presence of the hot gases deficient in carbon dioxide passing therethrough, and partly in the electric furnace.

The combustible or reducing gases given off by the heat treatment in the electric furnace may also be employed for pre-heating the oxide or carbonate, or used for treating the carbonaceous or other material undergoing decomposition or reduction at any stage in the process, or, after their sensible heat has been utilized in the distillation chamber, they may be passed through waste heat boilers, the combustible gases present in the mixture being combusted partly or entirely by the admission of a sufficient quantity of air.

It will further be understood that, when the reducing operation carried on in the electric furnace is such that the gases given off consist largely of carbon dioxide, the volume of stripped gases admixed therewith can be increased to a figure that will reduce to the desired percentage the carbon dioxide content of the admixed gases which enter the distillation chamber.

In calcining calcium carbonate both the time factor and the decomposing temperature depend upon the degree of concentration of the carbon dioxide present in the gas, or in other words, the concentration of the carbon dioxide gas mixture depends upon the number of molecules of carbon dioxide per litre which is in proportion to the partial pressure of the carbon dioxide in the gas mixture. At different temperatures, that is to say, for given temperatures and given carbon dioxide concentrations definite equilibriums exist, and it will be clear that by altering the percentage of carbon dioxide present in the gas at any given temperature, new equilibriums will be found, so that by aiming at a definite equilibrium and a controlled concentration of carbon dioxide it will be clear that the temperature can be adjusted to the new equilibrium conditions.

In the production in electric furnaces of calcium carbide the reaction takes place according to the following formula:

$$3C + CaO = CaC_2 + CO$$

A certain amount of the carbon monoxide will be converted into carbon dioxide owing to the possible presence of atmospheric oxygen.

The formula shows that 36 lbs. of carbide combines with 46 lbs. of calcium oxide to produce 64 lbs. of calcium carbide plus 28 lbs. of carbon monoxide.

In ordinary practice limestone of, say, 90 per cent purity, requires between 25 and 30 per cent by weight, of coal containing, say, 70 per cent of carbon, to release by the oxidizing of carbon into carbon dioxide, the necessary quantity of heat for calcining the calcium carbonate. It will be clear from the above equation that, on the assumption that the raw coal contains 70 per cent of carbon, 51.5 lbs. of coal will be required to produce 64 lbs. of calcium carbide. Furthermore, and in order to produce the necessary heat for the calcining of the calcium carbonate, a further 27.5 lbs. of coal will be required, or in all 89 lbs. of coal has to be admitted to the system for every 110 lbs. of 90 per cent calcium carbonate or raw limestone. The gas evolved under the above method will contain the following percentages by volume:

Nitrogen ---------------------------- 62.6%
Carbon dioxide ---------------------- 27.0%
Carbon monoxide --------------------- 10.4%

Ordinarily the gas produced on the basis of the above figures will contain 71 per cent of nitrogen and 29 per cent of carbon dioxide. Consequently, it is clear that if the carbon dioxide percentage in the gas is reduced by 2 per cent of the total gas volume, or 7.15 per cent on the basis of the carbon dioxide volume, and therefore the partial pressure of the carbon dioxide by the admixture of the volume of carbon monoxide given off during calcium carbide formation is diminished by 7.15 per cent then the equilibrium conditions in relation to the usual temperatures required by these new conditions are of the order of about 700° C. as against the ordinary temperatures of 750° C. to 800° C.

The presence of the distillation gases evolved from raw coal during limestone burning will also tend to reduce further the $CO_2$ percentage in the gas to an extent which amounts to approximately another 2 per cent. It will thus be seen that by means of the above-described cycle of operations it is possible not only to effect the decomposition of the calcium carbonate at lower temperatures, but also to effect considerable saving in the consumption of energy in the electric furnace, since the ingredients, namely, the calcium oxide and the carbon for the reaction, are fed into the electric furnace in a highly heated state, which, by way of example, may be to the order of 700 to 750° C.

We claim:

1. A method of manufacturing calcium carbide, wherein calcium carbonate is admixed with sufficient raw solid carbonaceous material to effect not only the calcining of the carbonate, but also to yield calcium carbide when the mixture is fluxed in an electric furnace, comprising calcining the carbonate and converting it into calcium oxide in a distillation chamber by the action of a mixture of hot combustion gases and a controlled volume of a gas deficient in carbon dioxide so that said gases contain less carbon dioxide than is normally present in ordinary combustion gases, whereby the conversion is effected at lower temperatures than usual, and feeding the admixed oxide and coke resulting from said treatment into a carbide furnace.

2. The step in the process of manufacturing calcium carbide according to the method of claim 1 which comprises admixing calcium carbonate with a raw solid carbonaceous material and in effecting the decomposing action in the presence of a mixture of hot combustion gases and a controlled volume of a gas deficient in carbon dioxide, so that said hot gases contain less carbon dioxide than is normally present in ordinary combustion gases, said gases being passed in contact with and in contraflow to the solid materials, whereby the tarry vapors are withdrawn from the mixed solid materials as soon as they are evolved.

3. A method as claimed in claim 1 which comprises employing a quantity of raw carbonaceous material to provide for the first distillation stage of the process sufficient carbon to effect the subsequent reaction in an electric furnace, removing from the distillation chamber the vapors yielded up during the heat treatment, and feeding the solid products while still hot from said chamber into an electric furnace.

In testimony whereof we have affixed our signatures.

GEORGES PATART.
HARALD NIELSEN.